United States Patent
Barrier

[15] 3,682,347
[45] Aug. 8, 1972

[54] ARTIFICIAL PLANT HOLDER
[72] Inventor: Alvis L. Barrier, P.O. Box 430, Mineral Wells, Tex. 76067
[22] Filed: Dec. 22, 1969
[21] Appl. No.: 887,243

[52] U.S. Cl. .........................220/16, 47/41.1, 220/17
[51] Int. Cl. .............................................B65d 25/00
[58] Field of Search.......220/13, 16, 17, 18, 38.5, 15; 47/41.1

[56] References Cited

UNITED STATES PATENTS

| | | | |
|---|---|---|---|
| 1,154,993 | 9/1915 | Kercher | 220/15 |
| 1,541,799 | 6/1925 | Dodge | 220/16 |
| 2,676,434 | 4/1954 | Carlson | 47/41.1 |
| 2,740,546 | 4/1956 | Kowalski | 220/16 |
| 3,135,565 | 6/1964 | Bingham | 220/13 X |

FOREIGN PATENTS OR APPLICATIONS 911,771  4/1946  France........................220/17

*Primary Examiner*—Joseph R. Leclair
*Assistant Examiner*—James R. Garrett
*Attorney*—Howard E. Moore and Gerald G. Crutsinger

[57] ABSTRACT

A plant holder comprising an outer receptacle arranged to receive one or more containers for artificial plants. The plants are set in concrete in the containers which are locked to the receptacle to prevent unauthorized removal of the plants. The containers are secured to a platform which is detachably secured to an inwardly extending flange on the receptacle.

4 Claims, 6 Drawing Figures

PATENTED AUG 8 1972 3,682,347
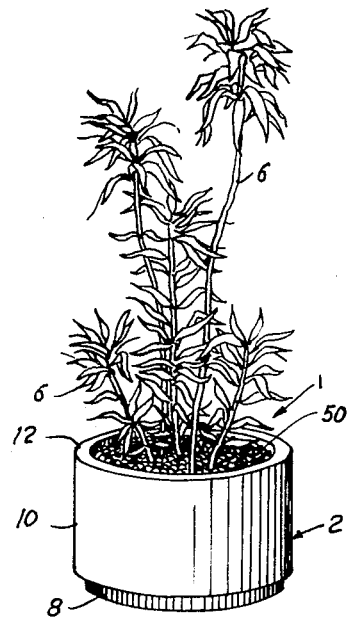
Fig. I
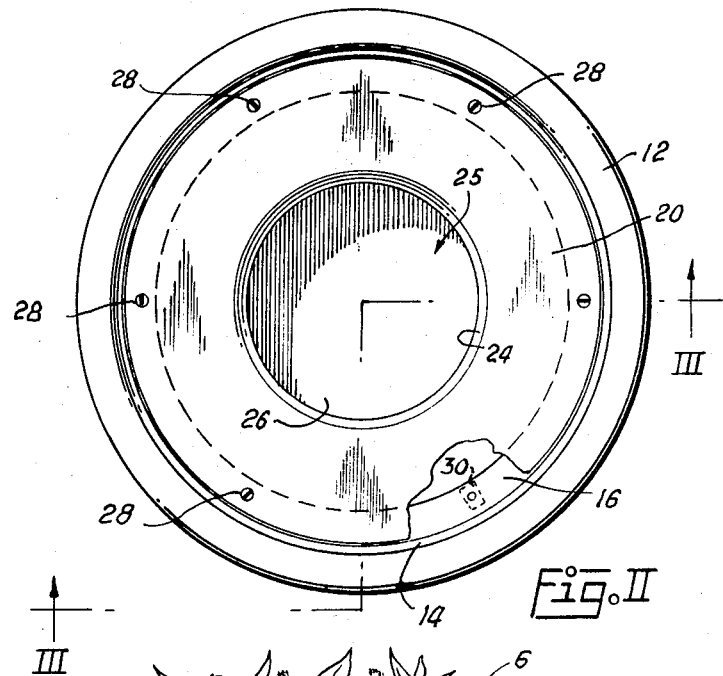
Fig. II
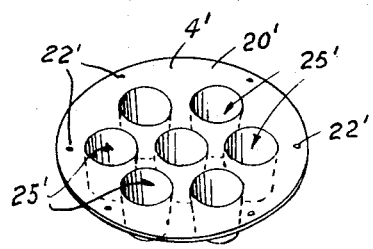
Fig. VI
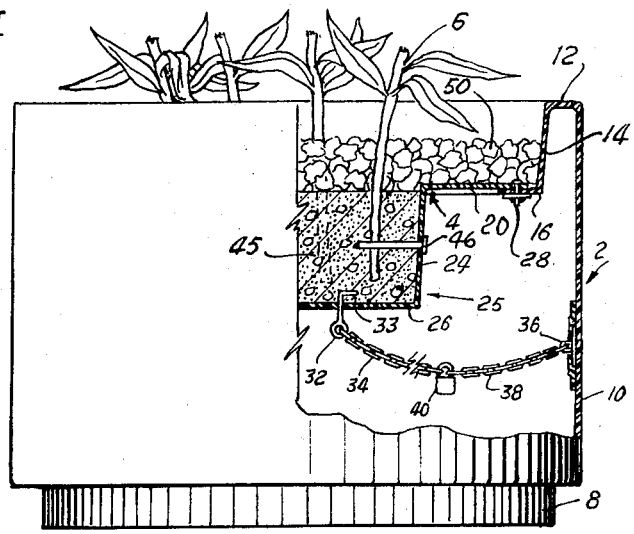
Fig. III
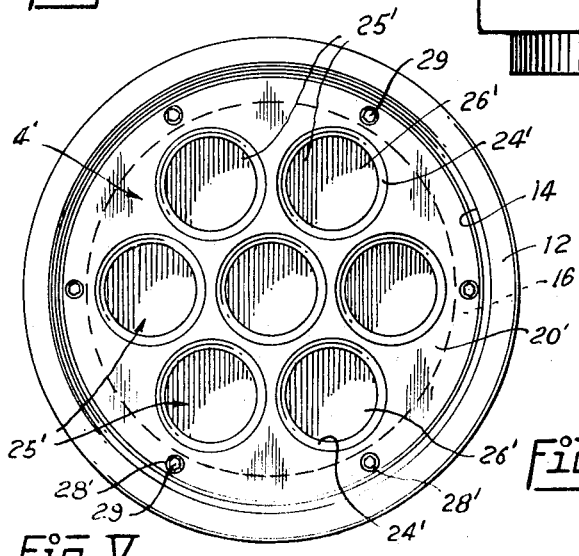
Fig. V
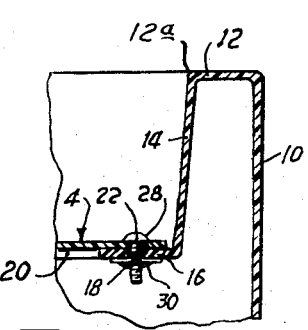
Fig. IV
INVENTOR
Alvis L. Barrier
BY Howard E. Moore
Gerald G. Crutsinger
ATTORNEYS

ARTIFICIAL PLANT HOLDER

BACKGROUND OF THE INVENTION

The use of artificial foliage, trees and shrubs for interior and exterior landscaping offers numerous advantages over use of live plants because the artificial plants may be permanently arranged and require a minimum amount of time for care and maintenance. Authentic reproduction of stems, buds and leaves achieve botanical correctness offering permanent beauty which is not obtainable with live plants.

Heretofore, the use of artificial plants for landscaping has been impractical for certain applications. Employment of artificial plants, which could be readily moved from one location to another, in public places, frequently left unattended, was impractical because of the constant threat of theft and vandalism. Artificial plants were often employed for decorating during business hours and then removed to a secure location for storage at night. Daily transporting of plants from one location to another is time consuming and the benefits achieved from the use of the plants is destroyed when they are removed.

Another major difficulty encountered by users of artificial plants resulted from the fact that plants could not be readily rearranged or changed from one array to another without employment of qualified personnel.

SUMMARY OF INVENTION

I have developed a holder for artificial plants adapted to prevent unauthorized removal of plants therefrom. Locking means is provided for detachably securing a platform which supports one or more containers for flowers to an outer receptacle. The locking means is arranged to be disengaged only by authorized personnel.

A primary object of the present invention is to provide a holder for artificial plants particularly adapted to facilitate rearrangement of plants without destroying the array of the arrangement.

Another object of the invention is to provide a holder for artificial plants which is theft-proof.

Another object of the invention is to provide a holder for artificial plants particularly adapted for exterior use which minimizes the danger of destruction of plants by wind and rain.

A further object of the invention is to provide a holder for artificial plants which is segmented to form a receptacle and a platform, carrying artificial plants permanently set thereon in a predetermined array, which may be disengageably secured in the receptacle.

Other and further objects of the invention will become apparent upon referring to the detailed description hereinafter following and the drawings annexed hereto.

DESCRIPTION OF THE DRAWING

FIG. I is a perspective view of a plant holder having an arrangement of plants disposed therein;

FIG. II is a top plan view of a plant holder having a platform mounted therein supporting a single container;

FIG. III is a cross-sectional view taken along line III—III of FIG. II;

FIG. IV is an enlarged fragmentary cross-sectional view of the connection between a platform and the receptacle;

FIG. V is a top plan view of a plant holder having a platform mounted therein supporting a plurality of containers; and, FIG. VI is a perspective view of a platform supporting a plurality of containers, said platform being disconnected from the receptacle.

Numeral references are employed to designate like parts throughout the various figures of the drawing.

DESCRIPTION OF A PREFERRED EMBODIMENT

Referring to FIGS. I and III of the drawing, the numeral 1 generally designates a segmented plant holder comprising an outer receptacle 2 having a foliage platform 4 detachably secured thereto having plants 6 disposed therein.

The outer receptacle 2 comprises a base portion 8 secured to the lower ends of upwardly extending outer wall 10 which has a deflected upper portion comprising an inwardly extending portion 12 and a downwardly extending portion 14 arranged in any desired manner to provide pleasing appearance and structural reinforcing of the receptacle.

Downwardly extending portions 14 of the outer wall 10 are preferably downwardly converging to provide an opening intermediate the inner edges 12a of inwardly extending portion 12 which is larger than the outside dimension of platform 4 to facilitate positioning the platform in the receptacle 2.

Downwardly extending portions 14 of the outer wall 10 of receptacle 2 has a flange 16 extending inwardly from the lower edge thereof to form an inwardly extending flange for supporting platform 4. Flange 16 has spaced apertures 18 as best illustrated in FIGS. IV and VI of the drawing.

Foliage platform 4 comprises a connector 20 having spaced apertures 22 formed therein in overlying relation with apertures 18 in flange 16.

The connector 20 is secured to the upper edge of the wall 24 of container 25 for supporting said container. Each container 25 has a bottom 26 connected to the lower end of walls 24.

Locking means is provided to detachably secure platform 4 to the receptacle 2. As best illustrated in FIG. IV of the drawing, a threaded connector such as screw 28 extends through aperture 22 in platform 4 and through aperture 18 in flange 16 to threadedly engage suitable threaded interengaging means, such as speed nut 30 to lock the platform to the receptacle.

To provide added security to assure that platform 4 will not be removed from receptacle 2 by unauthorized persons, suitable anchor means, such as eye bolt 32 having a deflected end portion 33 is secured to platform 4. One end of flexible connector 34 is secured to the anchor member 32. An anchor member 36, having one end of flexible connector 38 secured thereto, is attached to the outer receptacle 2. The free ends of flexible connectors 34 and 36 are detachably secured together by a conventional lock 40.

A modified form of the invention is illustrated in FIGS. V and VI of the drawing wherein primed numerals indicate parts corresponding to those designated by like numerals in FIGS. I–IV of the drawing.

Connector member 20' on platform 4' is secured to the upper edge of a plurality of containers 25' positioned in a predetermined array. In the particular embodiment of the invention illustrated in FIG. V of the drawing threaded locking means 28' comprises screws having a head shaped to prevent rotation thereof with easily accessible tools. Each connector 28' has a socket 29 which requires the use of a special tool, such as an Allen wrench having a hexagon shaped male portion (not illustrated), for removal of threaded connector 28'. It should be appreciated that socket 29 in connector 28' can be of other shapes for receiving a complementary shaped tool.

Receptacle 2 may be constructed of any desired material. However, I contemplate the use of reinforced polyester because such material is strong, highly resistant to the effects of weather, and inexpensive to manufacture large quantities of plant holders of the type herein described.

Foliage platform 4 may likewise be constructed of any suitable material. However, I contemplate forming connector member 20 and containers 25 of a unitary piece of reinforced polyester.

Suitable means is provided to prevent removal of plants 6 from containers 25 and 25'. As illustrated in FIG. III of the drawing, such means comprises concrete 45 which may be poured into each container 25 or 25', the stems of plants 6 being positioned therein before the concrete 45 sets.

Means is provided to prevent removal of concrete 45 from the container 25 or 25'. As illustrated in FIG. III, such means comprises one or more projections or spikes 46 which are positioned through the wall of the container 25 or 25' before filling with concrete.

Preferably, granular material, such as crushed rock 50 is employed for covering connector member 20 and concrete 45 to enhance the appearance of the plant holder.

From the foregoing it should be readily apparent that plants 6 are secured in concrete 45 which is secured in containers 25, 25' of platform 4. Plants 6 are preferably arranged in containers 25 or 25' at a central location to be ordered in either a standard or custom arrangement.

Platform 4 is locked to receptacle 2 by threaded connectors 28 or 28'. If it is deemed expedient to do so, added protection is provided by the use of anchors 32 and 36 rigidly secured to the platform 4 and the receptacle 2, respectively, said anchors being locked together by flexible members 34 and 38 and a padlock or combination lock 40. Flexible members 34 and 38 are of sufficient length to allow removal of screws 28 to move platform 4 upwardly a distance sufficient to provide access to the lock 40.

From the foregoing it should be readily apparent that I have developed a plant holder which accomplishes the objects of the invention hereinbefore enumerated allowing substitution of one platform 4 having a plant arrangement for another platform 4 having a different plant arrangement in a receptacle 2. Means is also provided to prevent unauthorized removal of platform 4 from receptacle 2.

Having described my invention I claim:

1. A plant holder comprising, a receptacle having a bottom wall and upwardly extending outer walls around the peripheral edge thereof; an inwardly deflected upper end on said outer walls, said deflected end comprising an annular radially inwardly extending portion and a downwardly extending portion on the inner periphery of the inwardly extending portion; a radially inwardly extending annular flange secured to a lower portion of the downwardly extending portion of the outer wall, said flange terminating between the upper and lower edges of the outer wall of the receptacle; a container including a bottom wall and upwardly extending side walls; a platform secured to the container about an upper portion of said side walls, said platform being arranged and adapted to be secured to the flange of the receptacle for supporting the container in the receptacle; and threaded disengageable locking means extending through registering openings in the flange and platform to secure the platform to the flange, said locking means having a head with a non-circular socket formed therein whereby only a similarly shaped male portion of a tool can be inserted in said socket for effective removal of the locking means.

2. The combination called for in claim 1 wherein a plurality of containers are secured to and supported by the platform.

3. A plant holder comprising, a plurality of containers each including a bottom wall and an upwardly extending side wall for plants arranged in a predetermined array; substantially planar connector means secured to each container about an upper portion of said side walls, said connector being adapted to support the containers and to maintain them in the predetermined array; a receptacle having side walls; means for suspending the connector means in an upper portion of the receptacle below the upper periphery thereof such that the containers supported by the connector means are suspended intermediate upper and lower ends of the side walls of the receptacle; a first anchor secured to at least one of the containers; a bent end on said first anchor extending through a wall of at least one of the containers; concrete in at least one said container, said bent end of the first anchor being embedded in the concrete preventing detachment of the first anchor therefrom; a first flexible member secured to the first anchor; a second anchor secured to the interior of the receptacle; a second flexible member secured to the second anchor; and a lock for connecting said first and second flexible members to prevent unauthorized removal of the containers from the receptacle.

4. A plant holder comprising, a receptacle having a bottom wall and upwardly extending outer walls around the peripheral edge thereof; an inwardly deflected upper end on said outer walls, said deflected end comprising an annular radially inwardly extending portion and a downwardly extending portion on the inner periphery of the inwardly extending portion; a radially inwardly extending flange secured to a lower portion of the downwardly extending portion of the outer wall, said flange terminating between the upper and lower edges of the outer wall of the receptacle; a container including a bottom wall and upwardly extending side walls; a platform secured to the container about an upper portion of said side walls, said platform being arranged to be secured to the flange of the receptacle for supporting the container in the receptacle; a first anchor secured to the exterior of said container; a second anchor secured to the interior of the receptacle; a first flexible connector having an end secured to the first anchor; a second flexible connector having an end secured to the second anchor; and a lock to detachably connect the free ends of the flexible connectors to prevent unauthorized removal of the container from the receptacle.

* * * * *